United States Patent [19]

Russom

[11] Patent Number: 4,950,043

[45] Date of Patent: Aug. 21, 1990

[54] DISTORTION-FREE FIBER OPTIC SENSORS EMBEDDED IN TITANIUM

[75] Inventor: Jeff D. Russom, Maryland Heights, Mo.

[73] Assignee: McDonnell-Douglas Corporation, St. Louis, Mo.

[21] Appl. No.: 272,906

[22] Filed: Nov. 18, 1988

[51] Int. Cl.$^5$ .............................................. G02B 6/00
[52] U.S. Cl. .................................... 350/96.1; 350/96.3; 350/96.34
[58] Field of Search ................. 73/800, 802; 350/96.1, 350/96.11, 96.12, 96.29, 96.3, 96.34

[56] References Cited

U.S. PATENT DOCUMENTS 4,826,906  5/1989  Satake et al. .................... 524/381
4,836,030  6/1989  Martin .................................. 73/800

Primary Examiner—William L. Sikes
Assistant Examiner—John Ngo
Attorney, Agent, or Firm—Veo Peoples, Jr.

[57] ABSTRACT

Highly sensitive, fiber optical cables, embedded in titanium, and remaining free from the refractive distortion ordinarily attributable to the presence of diffused titanium molecules in the fiber, are made possible by an optical fiber intermetallic composite having a titanium aluminide barrier layer between the optical fiber material and a titanium matrix material. The composite forms a useful means of optically sensing and monitoring the environmental and structural disturbances to which titanium aircraft structures are exposed.

3 Claims, No Drawings

DISTORTION-FREE FIBER OPTIC SENSORS EMBEDDED IN TITANIUM

BACKGROUND OF THE INVENTION

1. Field of the Invention

This invention relates to metallic and intermetallic composite materials having embedded therein fiber optical cables for sensing and monitoring environmental and structural disturbances or effects upon the composite itself, and this invention relates to methods for manufacturing such composites. The composite materials are of the type used to construct aircraft structures, particularly the skin or surface of aircraft, including airplanes, missiles, or trans-atmospheric vehicles.

2. Description of the Prior Art

Ultrastructure research into advanced composite material structures for trans-atmospheric vehicles, missiles, and other advanced high-speed aircraft, particularly for their outer skin construction has been progressing at a rapid pace. Polymer-matrix reinforced composite materials, carbon fibers spun from organic polymer precursors, solid blocks of ceramic material, super sol-gels and molecular beam epitaxy are among the technologies for such ultrastructure research. These investigations involve control and positioning of load bearing fibers for reinforcement purposes and advanced molecular structuring for the materials employed in aircraft construction.

Although materials technology has expanded from glass fiber-polymer resin composites to certain metals, ceramics and polymers in a variety of forms for both reinforcing load-bearing fibers and matrix applications, there is a continually increasing need for improving the performance of intermetallics and matching their metallic properties to those of adjacent composite materials and structures. At present, graphite epoxy is the most common example of preformed composite material used in testing advanced material applications for aircraft structures. However, the mechanical complexity of other advanced composite materials, particularly titanium composites, is matched by the variety of defects that may occur. Engineering experience with these materials has not yet progressed to the extent that there is confidence in predicting safe service lives, given even minor defects, particularly the problems and questions associated with their compatibility to adjacent substrates. See, *American Institute of Aeronautics and Astronautics Second Aerospace Maintenance Conference* publication, May 21-23, 1986/San Antonio, Texas (AIAA-86-1139). Additionally, information is available in *Aviation Week & Space Technology*/Jul. 7, 1986, page 105, where the article DARPA, USAF Develop Advance Materials Processing Technology by Mr. Jay C. Lowndes is printed.

One current focus of ultrastructure composite materials research is that of embedded optical fiber sensors fabricated as an integral part of a composite structure. Such fibers could be used to measure uniaxial strain along the fiber, to detect high frequency dynamic strains in the composite material, to transmit acoustic emissions, to detect and characterize damage as it happens in advanced composite materials, and to measure the affects of electric fields, magnetic fields, pressure, and/or temperature on the composite material. In fact, it is desired to develop composite materials having integral optical fiber sensors that would enable the production of a full-up electronic device embedded in an aircraft skin, including, for example, antennas, or other elements where optical light waves travelling through the fiber may be modulated and, in the absence of extraneous optical distortions, they can be interpreted into electronic signals on the basis of various phase changes. Therefore, the environmental and structural disturbances on the composite material forming the skin of an aircraft, can be detected and monitored.

Although limited success has been achieved in demonstrations of optical fibers embedded in graphite epoxy test specimens, the trend to test fiber reinforced composite structures in advanced aircraft or space vehicles has overtaken the data basis, analytical methods, and engineering procedures to the extent that little assurance and/or success has been achieved with metal alloy composites currently in service, particularly, in the case of non-homogeneous composite materials. One such currently in-service composite for which it would be highly desirable to embed optical fibers is titanium matrix composite material.

It is known that titanium molecules attack the silica present in optical fibers so as to alter its refractive index. Although this effect has been used to the advantage of manufacturing certain types of optical fiber material as, for example, in U.S. Pat. No. 2,272,342, where optical fibers were made lossy by virtue of the fact that $Ti^{4+}$ reduced to $Ti^{3+}$ absorbs light in the red and infrared spectral regions, the diffusion of titanium molecules from titanium matrix composites adjacent to an optical fiber, distorts or prohibits the transmittance of a light's signal and/or its refractive index so as to breakdown the optical fiber and render it ineffective as a means of sensing the disturbances on the skins of aircraft.

A titanium matrix composite ultrastructure material having a distortion-free optical fiber integrally embedded therein, effective in sensing the environmental disturbances on the composite material, and a method for manufacturing the same would fulfill a long felt need in the industry and would represent a tremendous advancement in the art.

SUMMARY OF THE INVENTION

It is a principal object of the present invention to provide a novel composite material comprising titanium matrix and an integrally embedded optical fiber which would be free of titanium-derived distortion or breakdown ordinarily characteristic of optical fiber material adjacent to titanium substrates.

It is a further object of the present invention to provide a novel use of titanium aluminide as a barrier material inhibiting, disrupting, modifying, or by some other physiochemical means preventing refractive contamination or other breakdown to optical fibers from titanium molecules diffused therein or adjacent thereto.

It is a still further object of the present invention to provide a novel method of manufacturing an intermetallic/optical fiber-embedded-composite exceptionally effective in monitoring distortion-free optical signals directly translatable to the environmental and structural disturbances on such composite material.

These objects and others will become apparent from the following description of preferred embodiments and the examples.

DETAILED DESCRIPTION OF THE PREFERRED EMBODIMENTS

The novel intermetallic-fiber optic composite of the present invention comprises optical fiber material embedded in a titanium matrix and has a titanium aluminide barrier layer there between.

The optical fiber material is preferably a glass cylinder which may contain one or more dopant material to achieve the desired optical property of transmitting information modulated light for measuring acoustic waves, electric or magnetic fields, pressure, temperature, and deflection from uniaxial and high frequency dynamic strains to the structure within which the optical fiber is embedded. The optical fiber material is of the type used as or in conjunction with sensors having the capability to measure various environmental or structural disturbances. These disturbances can be low frequency as well as high frequency in nature. They can be pressure or temperature variations, such normally measured with thermocouples, or they can be stress related. For example, 12 meter length fibers can serve as the strain sensitive portion of a 300 meter length fiber coil and have one end attached to an electrically driven translation device. They must be capable of, for example, transmitting the amplitudes of initial harmonics of the acousto-optic signal which can be thereafter translated and recorded for different path length changes. Various electronic equipment such as phase-nulling optical gyros, interferometers, and hardware such as light emitting diodes, fiber beam splitters, frequency shifters or modulators may be employed therewith through known skill of the art methods.

It is essential that the optical fiber material remain capable of monitoring important parameters, particularly temperature and pressure as well as electric and magnetic fields, acoustic waves, and strain in the composite material in which the optical fiber material is embedded. When used in a particularly preferred embodiment of the invention as integral sensors, the fiber optic material must be immune to radio frequency and electrical interference, especially when it is desired to integrate the sensors with on-board optical communications systems of the aircraft. The reason that diffused titanium molecules, adjacent to or having migrated into the optical fiber, serve to breakdown the optical fiber, rendering it ineffective for these purposes, is not completely understood. However, one possible explanation is that the titanium's effect on the refractive index of the optical fiber material creates such a deleterious distortion that the highly sensitive phase changes which must be detected are simply not transmitted. We have and shall employ the term "distortion-free" to mean that this breakdown and/or interference from titanium is not experienced.

We have found that a thin layer of titanium aluminide between the optical fiber material and the titanium matrix of the composite provides this distortion-free characteristic and in some manner protects the optical fiber material from the attack of diffused titanium molecules. It is not known whether the titanium aluminide absorbs diffused titanium during extreme environmental parameters such as temperature or pressure, or whether it reacts with all titanium which might potentially diffuse into the optical fiber, to form titanium aluminide molecules such as $Ti_3Al$, $TiAL$, or $TiAl_3$ which may be inert to the optical fiber, or whether the presence of the titanium aluminide molecules themselves somehow reverse the distortion of silica based optical fiber material from attack by titanium, or whether some other complex with silica is catalyzed, but what is known is that absent the titanium aluminide barrier layer, titanium matrix embedded optical fibers are inoperative.

The titanium aluminide intermetallic compound or alloys may be composed of any of the well-known relative concentrations of titanium and aluminum with the aluminum ranging in weight percent from preferably 16 to 36 percent, or higher.

One particularly preferred titanium aluminide barrier layer may be formed in situ from coating fiber optic material with aluminum and thereafter consolidating the aluminum-coated fiber optic material with titanium matrix composites at elevated temperatures and pressures of preferably 1500° to 2000° F. and 15,000 to about 50,000 psi pressure. Titanium matrix composite material of the type commonly employed to construct the skins of airplanes is preferred. Such matrix composites, in addition to titanium, may also contain for example, aluminum and niobium. These and other titanium matrix composite materials ordinarily distort and/or breakdown fiber optic material.

In the process of the present invention, the titanium aluminide barrier layer may range in thickness to any effective and practical level. This may be achieved by any convenient means.

In the particularly preferred in situ method of manufacturing the intermetallic-fiber optic composite of the present invention, cylindrical optical fiber rods or cables are coated with aluminum by any of several means, i.e. ion vapor deposition such as that employed in co-pending application Ser. No. 137,094, but with temperatures and pressures adapted to coating fiber optic cables without melting the cable. Alternatively, other methods of coating aluminum onto fiber optic material may be adapted from any of the well-known processes for doing so including that of U.S. Pat. No. 4,540,601. The aluminum coated optical fibers may then be placed in a hot isostatic press, together with titanium powder and if desired, aluminum powder and solid titanium matrix material or alloy and together consolidated at the previously described temperatures and pressures.

The resultant intermetallic-fiber optic composite material has a distortion-free sensing capability insofar as the embedded fiber optic material is concerned, an intermetallic titanium aluminide barrier adjacent thereto, and an outer titanium matrix or structure. The barrier serves to prevent, inhibit, or alter the distortion causing diffusion of titanium molecules which otherwise renders the embedded fiber optic material ineffective for purposes of this invention.

The following examples of the present invention are intended to illustrate the invention without unduly limiting the same.

EXAMPLE 1

Fiber optic cables together with titanium powder were placed in a ¼" diameter titanium tube. The titanium powder was an alloy of titanium, aluminum, and niobium. The tube was out-gassed at 500° F. and sealed. The tube was then placed in a hot isostatic press for consolidation. A titanium matrix composite was consolidated at 1800° F. and 30,000 psi. Upon visual examination of the uncoated fibers, it was determined that the doped core of the fiber was damaged such that a reliable light signal could not be transmitted.

EXAMPLE 2

The procedure of Example 1 was followed except that the fiber optic cables were coated with a thin layer of aluminum prior to consolidation. Metallographic examination of the intermetallic layer adjacent the fiber optic cable showed that it had transformed into titanium aluminide molecules having the following formulas:

$Ti_3Al$, $TiAl$, and $TiAl_3$.

Visual examination of the titanium aluminide coated fiber indicated that the doped core of the fiber was still intact. Note that the light is more intense in the doped core (doped core is roughly twenty-five time smaller than the total fiber diameter).

What is claimed:

1. A highly sensitive intermetallic-fiber optic composite, capable of distortion-free optical monitoring of the environmental and structural effects on the skin of an aircraft, said composite comprising;
    (a) optical fiber material embedded in a titanium matrix, and
    (b) a titanium aluminide barrier layer between the optical fiber and the titanium matrix.

2. The composite of claim 1 wherein the titanium matrix consists essentially of a titanium alloy of the type used in the construction of aircraft skins.

3. The composite of claim 2 wherein the titanium alloy comprises titanium, aluminum, and niobium.

* * * * *